United States Patent [19]

Ohura et al.

[11] 4,230,209

[45] Oct. 28, 1980

[54] MEANS OF STRINGING TROLLEY WIRES

[75] Inventors: Yasushi Ohura, Tokyo; Susumu Ohwada, Yokohama; Akira Nakamura, Suita; Mitsuo Kitanishi, Nishinomiya; Yakuharu Nakamura; Akio Tamura, both of Hitachi, all of Japan

[73] Assignees: Japanese National Railways, Tokyo; Sumitomo Electric Industries, Ltd., Osaka; Hitachi Cable Ltd., Tokyo, all of Japan

[21] Appl. No.: 950,614

[22] Filed: Oct. 12, 1978

[30] Foreign Application Priority Data

Oct. 20, 1977 [JP] Japan .................. 52/125080

[51] Int. Cl.² .......................................... B60M 1/20
[52] U.S. Cl. .................................................. 191/40
[58] Field of Search ............... 191/22 R, 23 A, 33 R, 191/40, 41, 42, 43

[56] References Cited

U.S. PATENT DOCUMENTS

| 2,990,458 | 6/1961 | Mageoch | 191/40 |
| 3,985,211 | 10/1976 | Bommart | 191/40 X |

FOREIGN PATENT DOCUMENTS 38-311236 4/1963 Japan .
43-860234 5/1968 Japan .

Primary Examiner—Richard A. Schacher
Attorney, Agent, or Firm—Wenderoth, Lind & Ponack

[57] ABSTRACT

Means of stringing trolley wires comprises a supporting portion, resilient portions and a sliding portion. The supporting portion comprises a box member having an opening at the bottom thereof, and each of the resilient portions comprises a spring member and a supporting rod which protrudes through the opening of the box member and is adapted to move and incline in compliance with the condition of the sliding portion while the sliding portion comprises a pair of long ears and long trolley wires clamped by the pair of the long ears. The long ears of the sliding portion are supported at predetermined intervals by a plurality of the supporting rods of the resilient portions.

5 Claims, 5 Drawing Figures

MEANS OF STRINGING TROLLEY WIRES

BACKGROUND OF THE INVENTION

The invention relates to means of stringing trolley wires and more particularly to an improved means of resiliently supporting an overhead line having a lengthwise rigid structure.

In recent years, there has been remarkably developed means of resiliently supporting an overhead line of a length-wise rigid structure in place of a catenary suspension system as a laying system of trolley wires in a railway tunnel due to the fact that trolley wires must be laid in a limited laying area therein.

The means as set forth above, which resiliently supports an overhead line of a lengthwise rigid structure, mainly comprises a supporting portion, resilient portions and a sliding portion. The supporting portion is fixed to insulators installed at the inner surface of a tunnel and each of the resilient portions is held by the supporting portion to provide an overhead line with a vertical resiliency while the sliding portion is constructed to be rigid and supported by the resilient portions thereby providing the overhead line which is resiliently supported through the resilient portions by the supporting portion.

According to the resiliently supported rigid overhead line in the prior art as set forth above, each of the resilient portions is effectively adapted to accommodate the uneven contact pressure of a pantograph against the sliding portion when the pantograph moves vertically in the contact thereof with the sliding portion during the running of a train. This allows the stable collecting of electrical current for a pantograph even though a train runs in a high speed as recently prevailed. Further, the entire means is possible to be made smaller because no catenary suspension is necessary.

However, it should be noted that the contact conductor of the sliding portion is constructed of a plurality of rigid conductor units of a predetermined length along the overhead line for the mechanical reason that the sliding portion is required to have rigidity necessary to endure the pushing-up force of a pantograph.

Accordingly, there has been a drawback in the conventional means that a pantograph has the tendency of separating from the contact conductor at the joint portions of the conductor units. Further, it has been observed that the separation of a pantograph is aggravated upon the sliding portion affected by the transverse component of the thrusting force of the pantograph. That is, the resilient portions do not work properly to provide the sliding portion with the vertical resilient movement because the pantograph generates the transverse movement in the contact conductor in addition to the vertical movement which is regularly resulted from the pushing-up force of the pantograph of a high speed train. In addition, the malfunction of the resilient portions is caused by the thermal expansion and shrinkage of the contact conductor.

Conventionally, there has been otherwise proposed a system wherein a long trolley wire is clamped by a pair of long ears to provide a jointless overhead line in a long distance section whereby the separation of a pantograph from the contact conductor is eliminated. However, the long trolley wire expands and shrinks thermally proportional to the length thereof so that it is inevitable that the resilient portions are badly affected to such a greater extent that they do not work properly.

Accordingly, it is a main object of the present invention to provide means of stringing trolley wires wherein the number of joints of a sliding portion is sharply decreased thereby to result in a better characteristic for a pantograph of making a contact with the sliding portion in the high speed collecting of electrical current.

It is another object of the present invention to provide means of stringing trolley wires wherein resilient portions are perfectly excluded from the influence of the thermal expansion and shrinkage of a contact conductor.

BRIEF DESCRIPTION OF THE INVENTION

According to the present invention, means of stringing trolley wires in a railway tunnel comprises a supporting portion fixedly installed at the inner surface of the railway tunnel, said supporting portion comprising a long box member having an opening formed at the bottom thereof, resilient portions supported at predetermined intervals by said supporting portion, each of said resilient portions comprising a spring member and supporting rod which is protruded through said opening of said box member and adapted to move longitudinally and incline in compliance with the condition of the trolley wires, and a sliding portion supported by said resilient portions, said sliding portion comprising a pair of long ears each having a lengthwise rigid structure and rotatively supported by said supporting rods and long trolley wires each clamped by said pair of said long ears to provide the sliding surface of said trolley wires with a lengthwise rigid structure.

BRIEF DESCRIPTION OF THE DRAWINGS

The aforementioned and other objects and features of the present invention shall be described hereinafter in detail with reference to preferred embodiments thereof shown in the accompanying drawings, wherein.

DETAILED DESCRIPTION OF THE INVENTION

Figure 1:
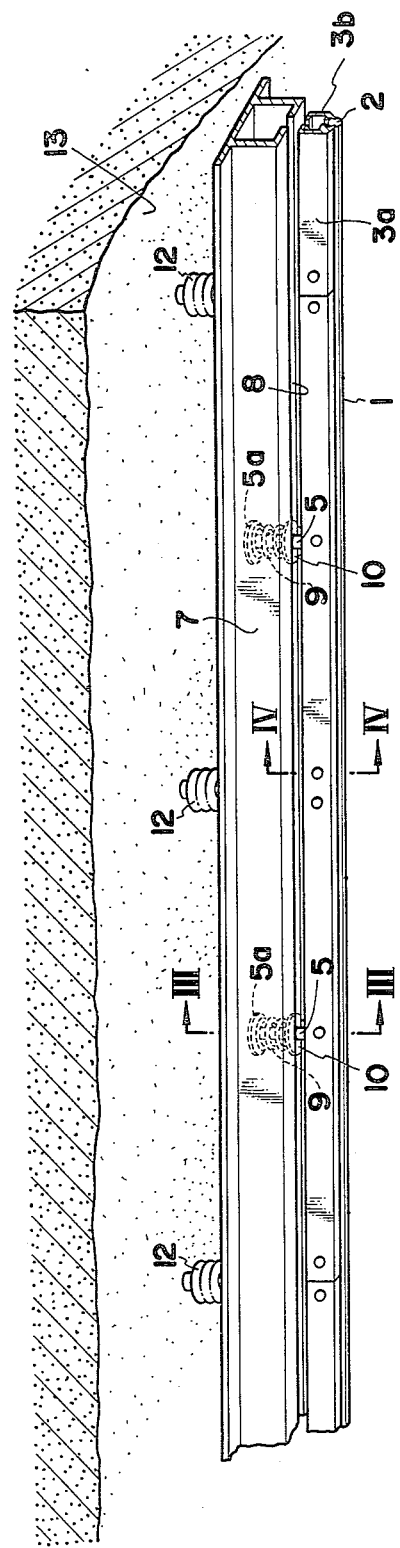
FIG. 1 is a perspective view illustrating an embodiment of the present invention.
Figure 2:
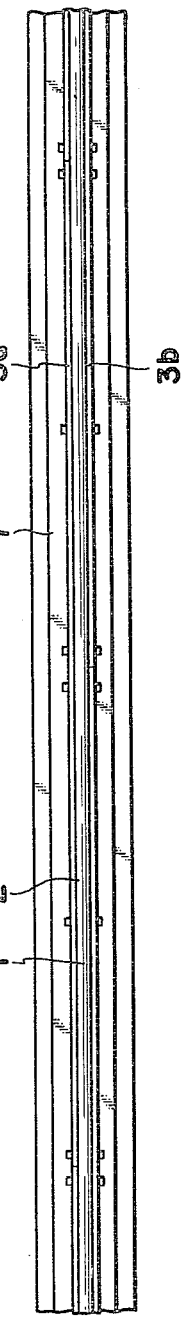
FIG. 2, is a bottom plan view illustrating an embodiment of the present invention.
Figure 3:
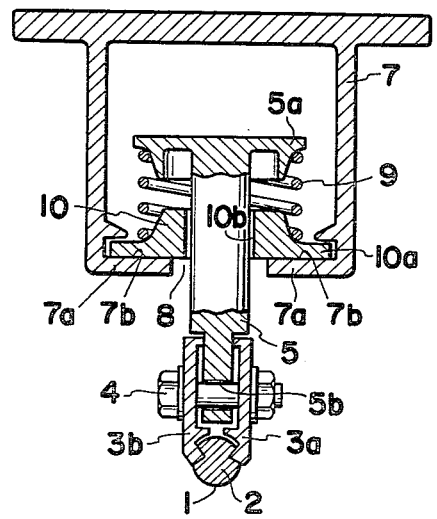
FIG. 3 is a cross-sectional view taken along the line III—III in FIG. 1.
Figure 4:
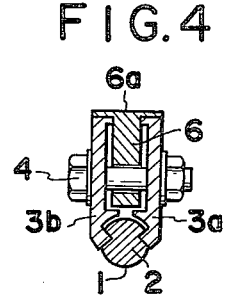
FIG. 4 is a cross-sectional view taken along the line IV—IV in FIG. 1.

Referring now to FIGS. 1 to 4 there is shown a preferred embodiment of the present invention wherein means of stringing trolley wires comprises a supporting portion, resilient portions and a sliding portion.

The sliding portion comprises a long trolley wire 2 having a sliding surface 1 with which a pantograph makes a pressure contact and a pair of long ears 3a and 3b each having a lengthwise rigid structure. The trolley wire 2 is clamped by a pair of the long ears 3a and 3b with use of a fastening means 4 such as a bolt and a nut to provide an overhead line in a railway tunnel. Each of the long ears 3a and 3b consists of a predetermined length of ear units each being jointed to one after another in a staggered manner at both sides of the trolley wire 2. Thus, the trolley wire 2 can be provided with a lengthwise rigid structure.

Each of the resilient portions comprises a supporting rod 5, a spring member 9 and a bushing member 10. The supporting rod 5 is provided with a loose aperture 5b for the fastening means 4 to support the assembly of the trolley wire 2 and the long ears 3a and 3b. The supporting rod 5 may be shaped as having a flange 5a at the top thereof so that the spring member 9 can be stably positioned between the flange 5a and the bushing member 10.

A plurality of the resilient portions are installed at predetermined intervals along the overhead line in such a manner that each of the supporting rods 5 supports the long ears 3a and 3b rotatively by means of the loose aperture 5b and the fastening means 4 thereby to allow the inclination of the supporting rods 5 in compliance with the movement of the trolley wire 2.

On the other hand, spacers 6 may be installed at the positions where the resilient portions do not exist on the pair of the long ears 3a and 3b. Each of the spacers 6 may be provided at the top thereof with a lid 6a to make a close fit to the long ears 3a and 3b.

The supporting portion comprises a long box member 7 and insulators 12. The long box member 7 is fixedly installed through the insulators 12 at the inner surface 13 of a railway tunnel. The long box member 7 may be of a rectangle cross section and may be provided at the bottom thereof with an opening 8 and flange portions 7a respectively. The bushing 10 is stably seated with edge portions 10a positioned on the top surfaces 7b of the flange portions 7a and may be formed with a loose aperture 10b through which the supporting rod 5 passes.

The resilient portions are positioned movably in a longitudinal direction of the box member 7 such that each of the supporting rods 5 protrudes its lower portion to support the trolley wire 2 through the combination of the fastening means 4 and the long ears 3a and 3b. Thus, the supporting rod 5 is resiliently positioned over the spring member 9 and can be inclined with the fastening means 4 loosely connected with the long ears 3a and 3b.

Figure 5:
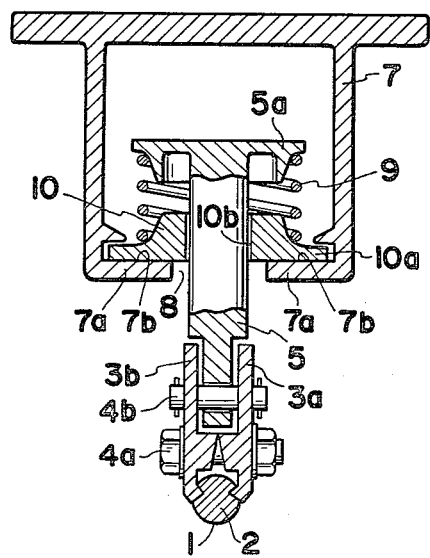
FIG. 5 is a cross-sectional view illustrating the cross section of FIG. 3 in another embodiment of the present invention.

Referring next to FIG. 5, there is shown another embodiment of the present invention wherein means of stringing trolley wires comprises a supporting portion, resilient portions and a sliding portion. In FIG. 5, like reference characters designate like or corresponding parts in FIGS. 1 to 4. The supporting and resilient portions are the same in their construction as ones shown in FIG. 3. However, the sliding portion is slightly different from that of FIG. 3 in that a trolley wire 2 is clamped by a pair of long ears 3a and 3b with use of a fastening means 4a while the combination of the long ears 3a and 3b and the trolley wire 2 is loosely connected to a supporting rod 5 with use of another fastening means 4b.

According to the present invention, there is provided an improved means of resiliently supporting an overhead line having a lengthwise rigid structure wherein long trolley wires are successively supported by a pair of long ears each having a lengthwise rigid structure so that the sliding surface of the trolley wires is not vertically waved thereby to avoid the separation of a pantograph therefrom. Further, the improved means of the present invention comprises resilient portions each of which comprises a spring member and a supporting rod both being adapted to slide longitudinally so that a bigger thermal expansion and shrinkage of the long trolley wires is easily absorbed in an expansion portion which is installed and predetermined intervals (although not explained in detail) thereby to avoid the deformation of the spring member. Still further, the supporting rod is adapted to slide longitudinally and incline and to be rotatively connected to the long ears so that the trolley wires are prevented from slipping up even in the high speed running of a train thereby to provide a pantograph with a constant sliding level in height. Thus, the separation of a pantograph from the sliding surface of the trolley wires can be perfectly avoided as desired.

Although the present invention has been described with reference to preferred embodiments thereof, many modifications and alterations may be made within the spirit and scope of the present invention.

What is claimed is:

1. Means of stringing trolley wires in a railway tunnel comprising
 a supporting portion fixedly installed at the inner surface of the railway tunnel, said supporting portion comprising a long box member having an opening formed at the bottom thereof,
 resilient portions supported at predetermined intervals by said supporting portion, each of said resilient portions comprising a spring member and supporting rod which is protruded through said opening of said box member and adapted to move longitudinally and incline in compliance with the condition of the trolley wires, and
 a sliding portion supported by said resilient portions, said sliding portion comprising a pair of long ears each having a lengthwise rigid structure and rotatively supported by said supporting rods and long trolley wires each clamped by said pair of said long ears to provide the sliding surface of said trolley wires with a lengthwise rigid structure.

2. Means of stringing trolley wires according to claim 1, wherein said box member is provided at the bottom thereof with flange portions on which said resilient portions are positioned to allow the motion thereof longitudinally.

3. Means of stringing trolley wires according to claim 1, wherein each of said resilient portions further comprises a bushing member which is provided with a loose aperture through which said supporting rod passes.

4. Means of stringing trolley wires according to claim 1, wherein said supporting rod is provided with a flange and said spring member is positioned between said flange of said supporting rod and edge portions of said bushing member.

5. Means of stringing trolley wires according to claim 1, wherein each of said pair of said long ears consists of a predetermined length of ear units, said ear units being jointed in a staggered manner at both sides of the trolley wires.

* * * * *